US012693545B2

(12) United States Patent
Zhuang et al.

(10) Patent No.: US 12,693,545 B2
(45) Date of Patent: Jul. 28, 2026

(54) OPTICAL ELEMENT DRIVING MECHANISM

(71) Applicant: Actutek Corporation, Taoyuan City (TW)

(72) Inventors: Po-Xiang Zhuang, Taoyuan City (TW); Wei-Jhe Shen, Taoyuan City (TW); Sin-Jhong Song, Taoyuan City (TW); Shou-Jen Liu, Taoyuan City (TW); Kun-Shih Lin, Taoyuan City (TW); Yi-Ho Chen, Taoyuan City (TW); Chao-Chang Hu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 333 days.

(21) Appl. No.: 18/521,634

(22) Filed: Nov. 28, 2023

(65) Prior Publication Data

US 2024/0176158 A1 May 30, 2024

Related U.S. Application Data

(60) Provisional application No. 63/428,238, filed on Nov. 28, 2022.

(51) Int. Cl.
*G02B 27/64* (2006.01)
*G02B 7/02* (2021.01)
(Continued)

(52) U.S. Cl.
CPC ............. *G02B 27/646* (2013.01); *G02B 7/02* (2013.01); *G02B 7/08* (2013.01); *G02B 7/09* (2013.01); *G02B 27/64* (2013.01); *G03B 13/36* (2013.01)

(58) Field of Classification Search
CPC ........ G02B 27/646; G02B 27/64; G02B 7/02; G02B 7/08; G02B 7/09; G02B 7/04; G02B 7/10; G02B 7/102; G02B 7/105; G02B 13/0065; G03B 13/36; G03B 13/34; G03B 3/10; G03B 5/00; G03B 30/00; H02K 33/00; H02K 33/18; H04N 23/50; H04N 23/67; H04N 23/68
See application file for complete search history.

(56) References Cited

U.S. PATENT DOCUMENTS 11,719,996 B2 * 8/2023 Hu .......................... G02B 7/285
                                                            359/696
11,796,894 B2 * 10/2023 Yu ............................ G02B 7/08
(Continued)

FOREIGN PATENT DOCUMENTS

CN      114114590 A      3/2022
CN      116908988 A      10/2023

OTHER PUBLICATIONS

Chinese Office Action issued on May 15, 2024 for the corresponding Application No. 202323240556.1; pp. 1-2.

*Primary Examiner* — Stephone B Allen
*Assistant Examiner* — Adam W Booher
(74) *Attorney, Agent, or Firm* — MUNCY, GEISSLER, OLDS & LOWE, P.C.

(57) ABSTRACT

An optical element driving mechanism is provided, including a movable portion, a fixed portion, and a driving assembly. The movable portion is connected to an optical element. The movable portion is movable relative to the fixed portion. The driving assembly drives the movable portion to move relative to the fixed portion.

16 Claims, 9 Drawing Sheets

(51) Int. Cl.
    *G02B 7/08*         (2021.01)
    *G02B 7/09*         (2021.01)
    *G03B 13/36*       (2021.01)

(56)             References Cited

U.S. PATENT DOCUMENTS

| | | | | |
|---|---|---|---|---|
| 11,880,087 | B2 * | 1/2024 | Shen | G02B 7/09 |
| 11,988,847 | B2 * | 5/2024 | Wang | H02K 11/215 |
| 12,140,816 | B2 * | 11/2024 | Lin | G02B 7/08 |
| 12,159,752 | B2 * | 12/2024 | Hu | G02B 27/646 |
| 12,181,631 | B2 * | 12/2024 | Hu | H04N 23/57 |
| 12,210,208 | B2 * | 1/2025 | Chang | G02B 7/08 |
| 12,235,510 | B2 * | 2/2025 | Lin | G02B 7/023 |
| 12,287,526 | B2 * | 4/2025 | Hu | H04N 23/54 |
| 12,289,525 | B2 * | 4/2025 | Hu | H04N 23/55 |
| 12,313,902 | B2 * | 5/2025 | Fan | H04N 23/54 |
| 12,353,045 | B2 * | 7/2025 | Chen | G03B 5/00 |
| 12,379,570 | B2 * | 8/2025 | Yu | G02B 27/646 |
| 12,416,779 | B2 * | 9/2025 | Hsu | G02B 27/646 |
| 12,449,716 | B2 * | 10/2025 | Wu | G02B 5/005 |
| 12,510,728 | B2 * | 12/2025 | Hu | G02B 7/22 |
| 2018/0335600 | A1 * | 11/2018 | Moto | G02B 7/021 |
| 2021/0026103 | A1 * | 1/2021 | Wu | G02B 7/02 |
| 2021/0278624 | A1 * | 9/2021 | Wang | G02B 7/08 |

* cited by examiner

1000

OPTICAL ELEMENT DRIVING MECHANISM

CROSS REFERENCE TO RELATED APPLICATIONS

This application claims the benefit of U.S. Provisional Application No. 63/428,238, filed Nov. 28, 2022, the entirety of which is incorporated by reference herein.

BACKGROUND OF THE INVENTION

Field of the Invention

The present invention relates to an optical element driving mechanism, and, in particular, to an optical element driving mechanism that includes a flexible printed circuit.

Description of the Related Art

As technology has developed, it has become more common for many types of modern portable electronic devices, such as action cameras, drones, aerial cameras, etc., to include image-capturing and video-recording functions. These electronic devices are used more and more often. In addition to the models that have been developed to be more convenient, thin, and lightweight, it is also desirable that they have optical qualities that are better and more stable, offering consumers more choice.

To improve the optical quality of the lenses or optical modules inside the electronic devices that have image-capturing or video-recording functions, there is a need to equip them with additional optical focusing motors. However, the interior volume of the portable electronic devices usually restricts the travel distance of these motors.

In addition, when a portable electronic device is placed in some particular environment, the external temperatures and air pressures might affect its optical modules, and their optical properties might be susceptible to interference with the optical module's proper operation. Therefore, there is a need to equip additional environment-sensing modules to adjust the lenses accordingly. However, this increases the complexity of the circuit layout.

As a result, the present disclosure provides an optical element driving mechanism that is different from the prior art, achieving the required circuit layout, obtaining the largest possible travel distance, and improving stability and image quality as well.

BRIEF SUMMARY OF THE INVENTION

An embodiment of the present invention provides an optical element driving mechanism, including a movable portion, a fixed portion, and a driving assembly. The movable portion is connected to an optical element. The movable portion is movable relative to the fixed portion. The driving assembly drives the movable portion to move relative to the fixed portion.

In some embodiments of the present disclosure, the optical element driving mechanism further includes a circuit assembly. The circuit assembly has a first circuit portion with a plate structure that is disposed on the fixed portion, a second circuit portion that is connected to the first circuit portion, a third circuit portion that is connected to the first circuit portion, and a connecting portion with a bent structure, wherein the second circuit portion is connected to the first circuit portion via the connecting portion.

In some embodiments of the present disclosure, the circuit assembly further has a first adhesive element that is disposed on the first circuit portion, with which the first circuit portion is adhered to the fixed portion, and a second adhesive element that is disposed on the second circuit portion, with which the second circuit portion is adhered to the fixed portion. The first adhesive element is not in direct contact with the second adhesive element. At least a portion of the connecting element is not in direct contact with the first adhesive element or the second adhesive element.

In some embodiments of the present disclosure, the fixed portion includes a bottom, wherein the first circuit portion is disposed on a surface of the bottom, and a case that is fixedly connected to the bottom. The surface has an exposed portion that is exposed from the first circuit portion when viewed in a direction that is parallel to the main axis.

In some embodiments of the present disclosure, the case is fixedly connected to the bottom via a third adhesive element. The third adhesive element is in direct contact with the case and the bottom. The third adhesive element is in direct contact with the circuit assembly. The surface is perpendicular to the main axis.

In some embodiments of the present disclosure, the third adhesive element is in direct contact with the surface. The third adhesive element is in direct contact with the first circuit portion.

In some embodiments of the present disclosure, the second adhesive element is in direct contact with a first sidewall of the bottom. The connecting portion is not in contact with the bottom. The first sidewall has a dodging portion that corresponds to the connecting portion.

In some embodiments of the present disclosure, the optical element driving mechanism further includes a first electronic element that senses the movement of the movable portion and is disposed on the circuit assembly, and a second electronic element that senses an environmental parameter and is disposed on the circuit assembly. The shortest distance between the center of the first electronic element and the movable portion is shorter than the shortest distance between the center of the second electronic element and the movable portion.

In some embodiments of the present disclosure, the first electronic element is disposed on a first circuit surface of the second circuit portion. The second electronic element is disposed on a second circuit surface of the third circuit portion. The first circuit surface faces the movable portion. The second circuit surface faces the fixed portion.

In some embodiments of the present disclosure, the first circuit surface and the second circuit surface face in the same direction. There is spacing between the center of the first electronic element and the center of the second electronic element in the direction of the main axis.

In some embodiments of the present disclosure, the optical element driving mechanism further includes an internal assembly, wherein the movable portion is movable relative to the fixed portion via the internal assembly. The internal assembly includes a first counterpart element that is fixedly connected to the fixed portion, a first clamping element that is fixedly connected to the movable portion, corresponding to the first counterpart element, and a first internal element that is located between the first counterpart element and the first clamping element. The first internal element is movable relative to the first counterpart element, the first clamping element, or both. The first clamping element, the first internal element, and the first counterpart element are arranged in sequence along the arrangement direction.

In some embodiments of the present disclosure, the internal assembly further includes a second counterpart element that is fixedly connected to the fixed portion, a second clamping element that is fixedly connected to the movable portion, corresponding to the second counterpart element, and a second internal element that is located between the second counterpart element and the second clamping element. A connecting line connects the center of the first internal element and the center of the second internal element. The connecting line passes through an opening of the movable portion when viewed in a direction that is parallel to the main axis.

In some embodiments of the present disclosure, the optical element at least partially overlaps the opening when viewed in the direction that is parallel to the main axis.

In some embodiments of the present disclosure, the optical element driving mechanism further includes a force-exerting assembly, stabilizing the movement of the movable portion. The force-exerting assembly includes a first magnetic element that is disposed on the fixed portion, and a first magnetic-conductive element that is disposed on the movable portion, corresponding to the first magnetic element and generating a first force along a first direction. The first clamping element is drawn to abut against the first counterpart element by the first force.

In some embodiments of the present disclosure, the force-exerting assembly further includes a second magnetic element that is disposed on the fixed portion, and a second magnetic-conductive element that is disposed on the movable portion, corresponding to the second magnetic element and generating a second force along a second direction. The volume of the first magnetic element is the same as the volume of the second magnetic element. The volume of the first magnetic-conductive element is different from the volume of the second magnetic-conductive element. The strength of the first force is different from the strength of the second force.

In some embodiments of the present disclosure, the volume of the first magnetic-conductive element is greater than the volume of the second magnetic-conductive element. The strength of the first force is greater than the strength of the second force.

In some embodiments of the present disclosure, both the first direction and the second direction point away from the connecting line that connects the center of the first internal element and the center of the second internal element. The angle between the first direction and the arrangement direction is different from the angle between the second direction and the arrangement direction.

In some embodiments of the present disclosure, the angle between the first direction and the arrangement direction is smaller than the angle between the second direction and the arrangement direction.

In some embodiments of the present disclosure, the angle between the first direction and the arrangement direction is smaller than 90 degrees. The angle between the second direction and the arrangement direction is greater than 90 degrees.

In some embodiments of the present disclosure, the resultant force exerted on the movable portion is formed by combining the first force and the second force. The resultant force is not parallel to the connecting line that connects the center of the first internal element and the center of the second internal element. The first clamping element is drawn to abut against the first counterpart element by the resultant force.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
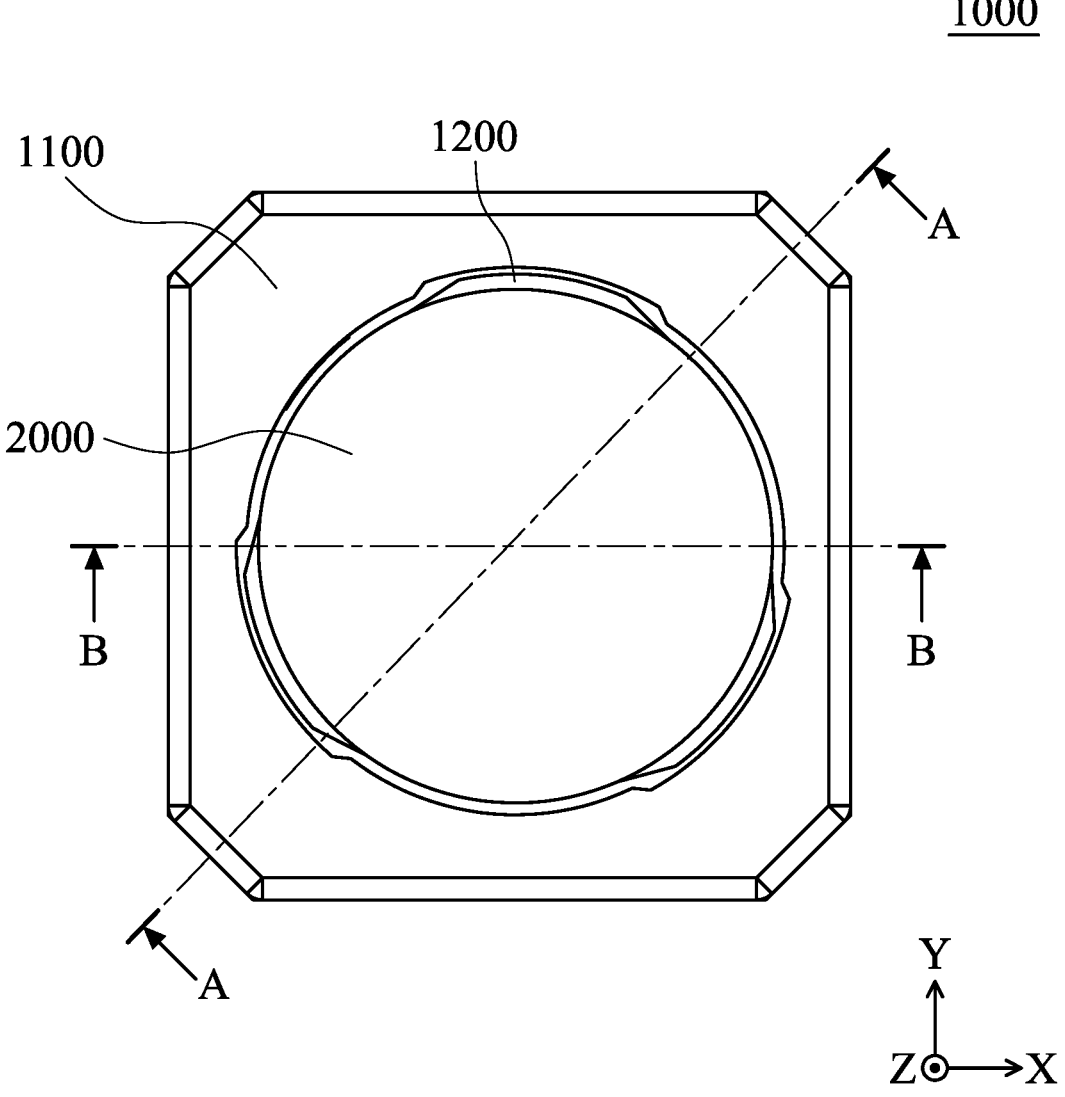
FIG. 1 shows a top view of the optical element driving mechanism, in accordance with some embodiments of the present disclosure.

The following description is made for the purpose of illustrating the general principles of the invention and should not be taken in a limiting sense. The scope of the invention is best determined by reference to the appended claims.

An optical system of an embodiment in the present invention is described below. However, it should be easily understood that the embodiments in the present invention provide many suitable concepts of invention that can be widely employed in various specific fields. The particular embodiments disclosed herein only depict specific ways to utilize the present invention, and are not intended to be limiting the scope of the present invention.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the system including the features.

Figure 2:
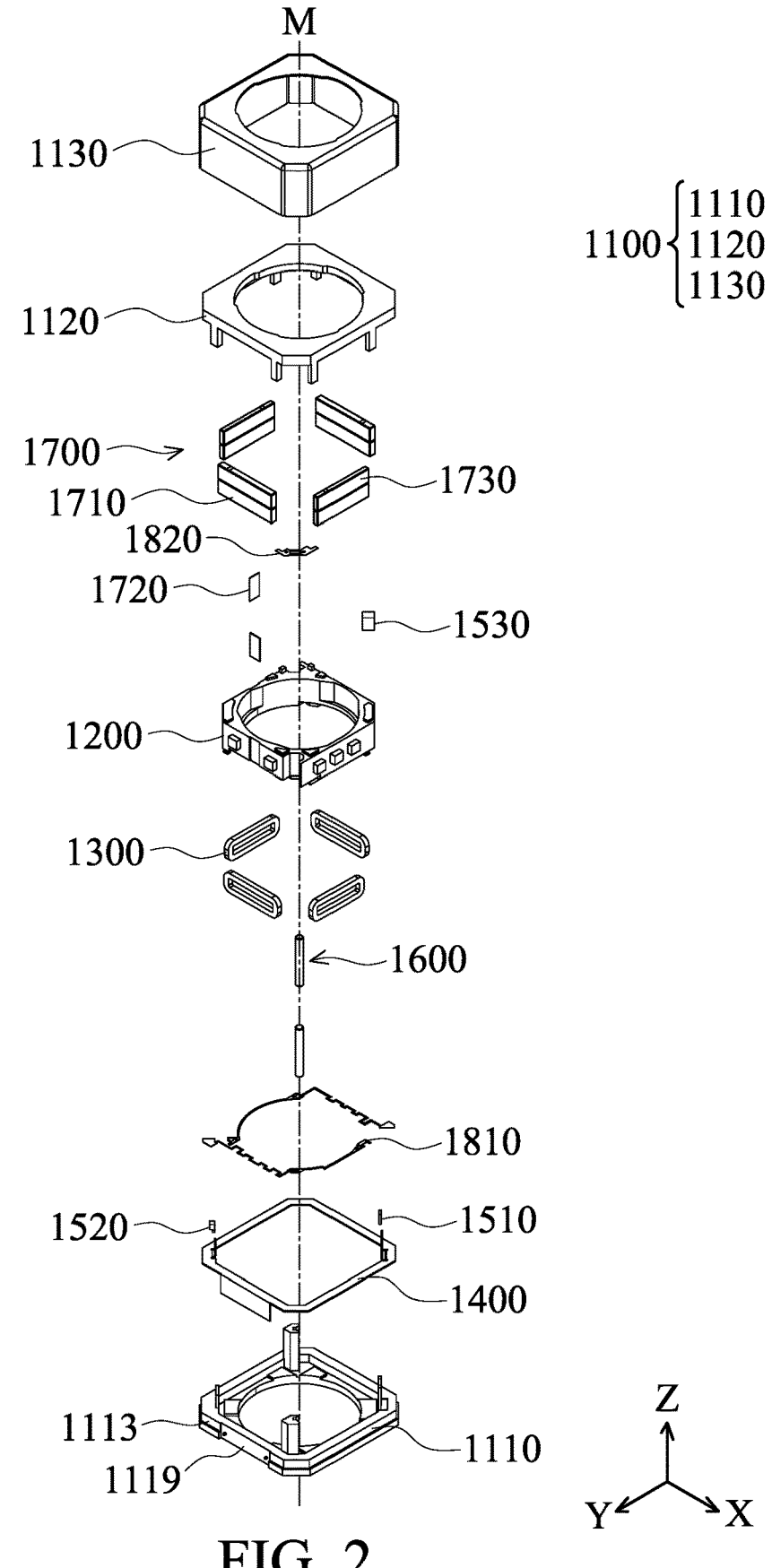
FIG. 2 shows an exploded view of the optical element driving mechanism, in accordance with some embodiments of the present disclosure.
Figures 3, 4:
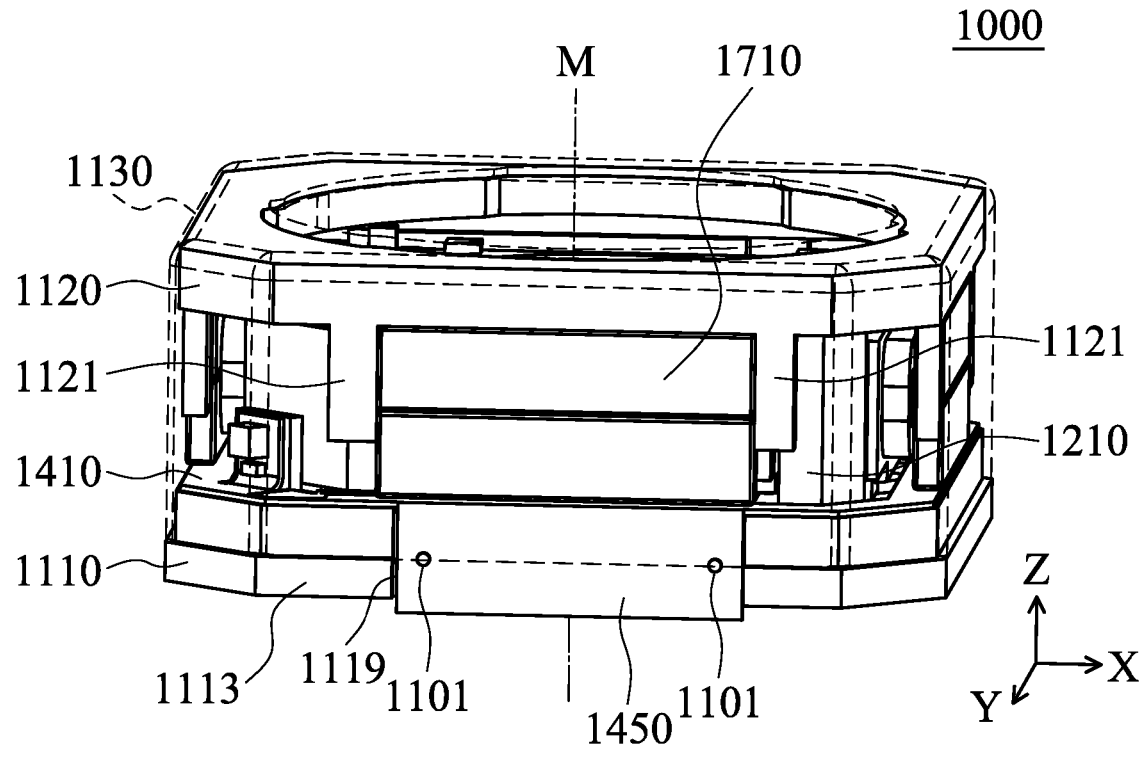
FIG. 3 shows a front perspective view of the optical element driving mechanism, wherein the case is shown in broken lines, in accordance with some embodiments of the present disclosure.
FIG. 4 shows a cross-sectional view of the optical element driving mechanism along line A-A in FIG. 1, in accordance with some embodiments of the present disclosure.

First, referring to FIGS. 1-3, FIG. 1 shows a top view of the optical element driving mechanism 1000, in accordance with some embodiments of the present disclosure; FIG. 2 shows an exploded view of the optical element driving mechanism 1000, in accordance with some embodiments of the present disclosure; and FIG. 3 shows a front perspective view of the optical element driving mechanism 1000, wherein the case 1130 is shown in broken lines, in accordance with some embodiments of the present disclosure.

As shown in FIG. 1, the optical element driving mechanism 1000 mainly includes a fixed portion 1100 and a movable portion 1200. The movable portion 1200 is connected to an optical element 2000, and the movable portion 1200 is able to bring the optical element 2000 to move together relative to the fixed portion 1100. The optical element 2000 may be any suitable optical elements, such as one or more lenses and/or lens groups, etc. The optical element 2000 may be held on the holder 1210 of the movable portion 1200 (FIG. 3), moving together with the holder 1210. The optical element 2000 at least partially overlaps the first opening 1205 of the movable portion 1200 (FIG. 10) when viewed in the direction that is parallel to the main axis M. For concision, the optical element 2000 is omitted in all of the subsequent figures.

As shown in FIG. 2, the fixed portion 1100 includes a bottom 1110, a frame 1120, and a case 1130. As shown in FIG. 3, the holder 1210 of the movable portion 1200 is disposed between the bottom 1110 and the frame 1120. The case 1130 is fixedly connected to the bottom 1110. Both the frame 1120 and the holder 1210 are disposed between the bottom 1110 and the case 1130.

In some embodiments according to the present disclosure, the optical element driving mechanism 1000 further includes a driving assembly 1300, driving the movable portion 1200 to move relative to the fixed portion 1100. As shown in FIG. 2, the driving assembly 1300 may include a plurality of coils. The configuration of the driving assembly 1300 will be described in detail in the following paragraphs.

As shown in FIG. 2, the optical element driving mechanism 1000 further includes a circuit assembly 1400. The circuit assembly 1400 is fixedly connected to the bottom 1110 of the fixed portion 1100. In some embodiments according to the present disclosure, the circuit assembly 1400 may be a flexible printed circuit (FPC).

In some embodiments, as shown in FIG. 3, the circuit assembly 1400 includes an extension portion 1450. The extension portion 1450 may act as the pin that connects the optical element driving mechanism 1000 and an external circuit (not shown). In some embodiments, the extension portion 1450 is formed by bending a portion of the circuit assembly 1400 downward in Z direction. The extension portion 1450 may be parallel to a sidewall (e.g. the third sidewall 1113 shown in FIG. 3) of the bottom 1110. Furthermore, in some embodiments, the side wall (e.g. the third sidewall 1113) of the bottom 1110 may have a concaved portion 1119, allowing the extension portion 1450 to be placed inside the concaved portion 1119, so that the surface of the extension portion 1450 is flush with the surface of the third sidewall 1113. In order to facilitate the connection between the extension portion 1450 and the external circuit, the extension portion 1450 is not fully covered by the case 1130. It may even extend beyond the lower side of the bottom 1110, as shown in FIG. 3. In some embodiments, the bottom 1110 may have one or more (e.g. two) first positioning elements 1101 for positioning the extension portion 1450. For example, the first positioning elements 1101 may be positioning pillars that protrude from the third sidewall 1113. The extension portion 1450 may have positioning holes that correspond to the first positioning elements 1101. By pairing the positioning pillars and the positioning holes, the extension portion 1450 may be positioned.

Figure 5:
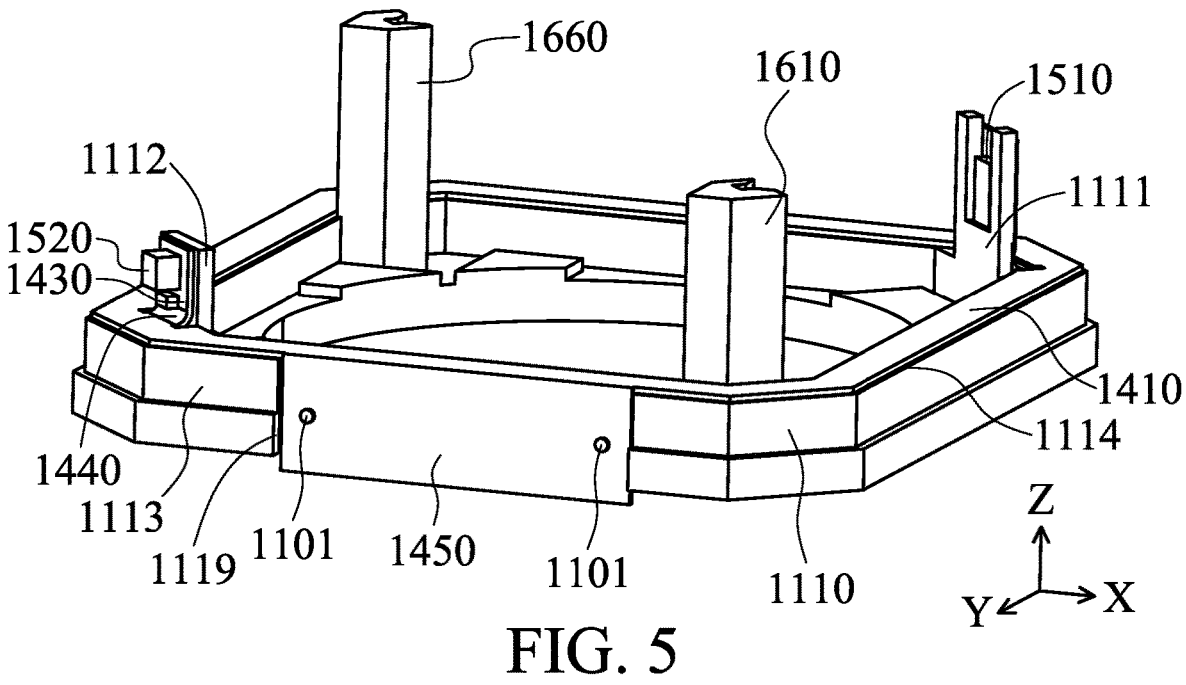
FIG. 5 shows a perspective view of the assembled bottom and circuit assembly, in accordance with some embodiments of the present disclosure.
Figure 6:
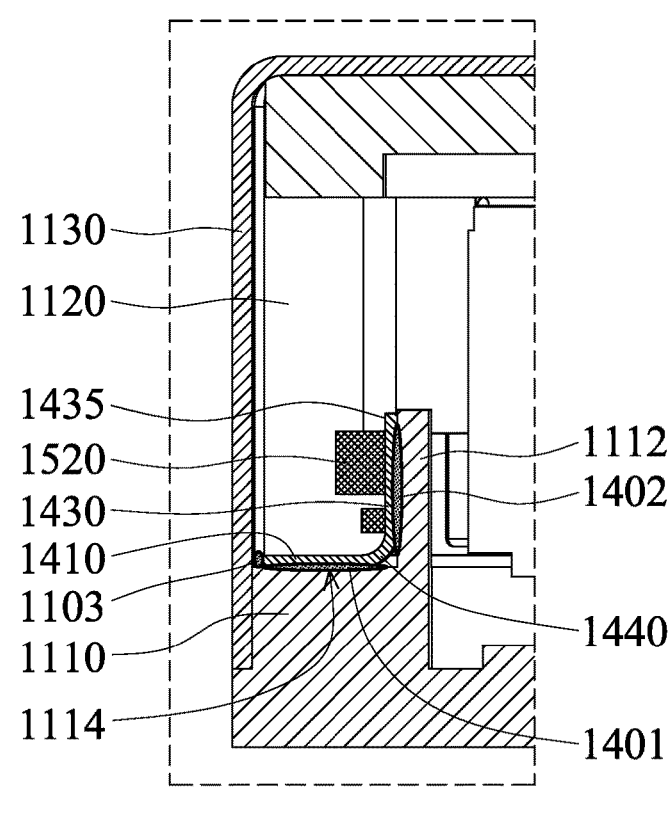
FIG. 6 shows a zoomed-in view of the left side portion of FIG. 4, in accordance with some embodiments of the present disclosure.
Figure 7:
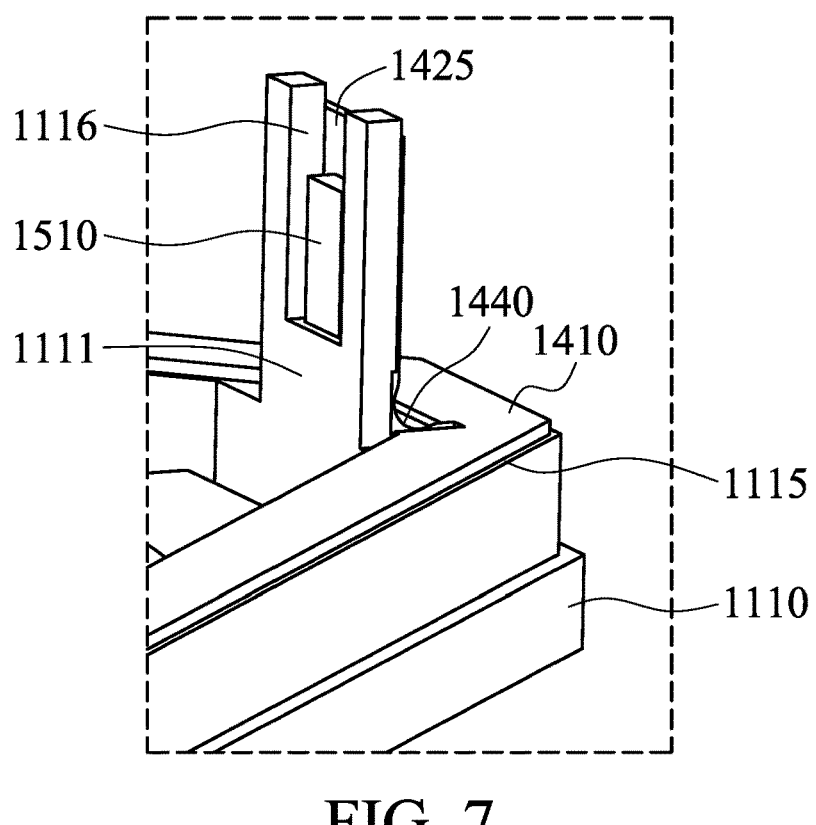
FIG. 7 shows a zoomed-in front view of the right side portion of FIG. 5, in accordance with some embodiments of the present disclosure.
Figure 8:
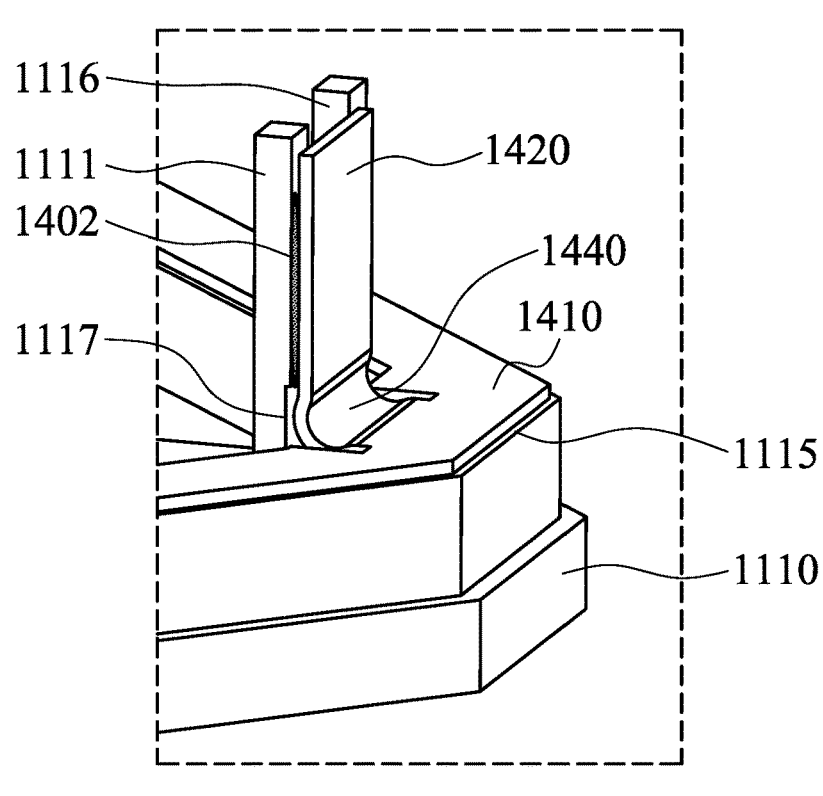
FIG. 8 shows a zoomed-in rear view of the right side portion of FIG. 5, in accordance with some embodiments of the present disclosure.

Next, referring to FIGS. 4-8, FIG. 4 shows a cross-sectional view of the optical element driving mechanism 1000 along line A-A in FIG. 1, in accordance with some embodiments of the present disclosure; FIG. 5 shows a perspective view of the assembled bottom 1110 and circuit assembly 1400, in accordance with some embodiments of the present disclosure; FIG. 6 shows a zoomed-in view of the left side portion of FIG. 4, in accordance with some embodiments of the present disclosure; FIG. 7 shows a zoomed-in front view of the right side portion of FIG. 5, in accordance with some embodiments of the present disclosure; and FIG. 8 shows a zoomed-in rear view of the right side portion of FIG. 5, in accordance with some embodiments of the present disclosure.

The circuit assembly 1400 further includes a first circuit portion 1410, a second circuit portion 1420, a third circuit portion 1430, and two connecting portions 1440.

As shown in FIGS. 4 and 5, the first circuit portion 1410 has a plate structure, and is disposed on the surface 1114 of the bottom 1110 that faces upward (+Z direction). The surface 1114 is perpendicular to the main axis M. In some embodiments, the first circuit portion 1410 may be adhered to the bottom 1110 of the fixed portion 1100 via the first adhesive element 1401 (FIG. 6). The first adhesive element 1401 may be glue or any suitable adhesive elements. During assembling, the first adhesive element 1401 may be placed on the first circuit portion 1410 first, and then adhered to the surface 1114 of the bottom 1110. Although it is not shown in the drawings, the first adhesive element 1401 may be coated on the entire surface of the first circuit portion 1410, which is sandwiched between the first circuit portion 1410 and the surface 1114 of the bottom 1110.

In some embodiments, the second circuit portion 1420 may be formed by bending a portion of the circuit assembly 1400 upward in Z direction. As shown in FIG. 4, the second circuit portion 1420 is disposed on the first sidewall 1111 of the bottom 1110. The first sidewall 1111 is a portion of the bottom 1110 that extends upward in +Z direction. In some embodiments, the second circuit portion 1420 may be adhered to the first sidewall 1111 via the second adhesive element 1402 (FIG. 8). As shown in the figures, the second adhesive element 1402 for the adhesion of the second circuit portion 1420 is in direct contact with the first sidewall 1111. Similarly to the first adhesive element 1401, the second adhesive element 1402 may be glue or any suitable adhesive elements. During assembling, the second adhesive element 1402 may be placed on the second circuit portion 1420 first, and then adhered to the first sidewall 1111 of the bottom 1110. Here, the second adhesive element 1402 is not in direct contact with the first adhesive element 1401.

In some embodiments, the third circuit portion 1430 is formed by bending a portion of the circuit assembly 1400 upward in Z direction. Similarly, as shown in FIG. 4, the third circuit portion 1430 is disposed on the second sidewall 1112 of the bottom 1110. The second sidewall 1112 is a portion of the bottom 1110 that extends upward in +Z direction. In some embodiments, the third circuit portion 1430 may be adhered to the second sidewall 1112 via the second adhesive element 1402 (FIG. 6). During assembling, the second adhesive element 1402 may be placed on the third circuit portion 1430 first, and then adhered to the second sidewall 1112 of the bottom 1110. Here, the second adhesive element 1402 is not in direct contact with the first adhesive element 1401, either.

As shown in FIG. 4, the second circuit portion 1420 is connected to the first circuit portion 1410 via the connecting portion 1440 with a bent structure. FIGS. 7 and 8 show the structure of the connecting portion 1440 more clearly. In this embodiment, the first sidewall 1111 further has a dodging portion 1117, which is an area concaved from the first sidewall 1111 and corresponds to the connecting portion 1440. The dodging portion 1117 provides extra space for the excessive length of the connecting portion 1440 to be accommodated inside the dodging portion 1117. This improves the efficiency of assembling. As shown in the figures, there is no first adhesive element 1401 or second adhesive element 1402 inside the dodging portion 1117. Also, at least a portion of the connecting portion 1440 is not in contact with the bottom 1110. That is, there is a suspended portion. Therefore, at least a portion of the connecting portion 1440 is not in direct contact with the first adhesive element 1401 and the second adhesive element 1402.

As shown in FIGS. 4 and 6, the third circuit portion 1430 is connected to the first circuit portion 1410 via another connecting portion 1440. In this embodiment, the second sidewall 1112 does not have a dodging portion. However, the connecting portion 1440 also has a suspended portion, so that at least a portion of the connecting portion 1440 is not in contact with the bottom 1110. Therefore, at least a portion of the connecting portion 1440 is not in direct contact with the first adhesive element 1401 and the second adhesive element 1402 as well. It should be noted that the two different connecting portions 1440 in the present disclosure are not limited to the configuration shown in the figures. In other words, the circuit assembly 1400 may include two connecting portions 1440 that need the corresponding dodging portions 1117. Alternatively, the circuit assembly 1400 may include two connecting portions 1440 that do not need dodging portions 1117. It depends on actual requirements.

Still referring to FIG. 6, the case 1130 of the fixed portion 1100 may be fixedly connected to the bottom 1110 via a third adhesive element 1103. As shown in the figures, the third adhesive element 1103 is in direct contact with the case 1130 and the bottom 1110. Specifically, the third adhesive element 1103 is in direct contact with the surface 1114 of the bottom 1110. In addition, the third adhesive element 1103 is in direct contact with the circuit assembly 1400. Specifically, the third adhesive element 1103 is in direct contact with the first circuit portion 1410 of the circuit assembly 1400. As a result, the bottom 1110, the case 1130, and the circuit assembly 1400 may be secured together via the third adhesive element 1103.

Furthermore, the surface 1114 of the bottom 1110 has an exposed portion 1115 (FIGS. 7 and 8) that is exposed from the first circuit portion 1410 when viewed along the direction that is parallel to the main axis M (Z direction). In other words, the edge of the first circuit portion 1410 is not aligned with the edge of the surface 1114. In addition, by placing the third adhesive element 1103 in the exposed portion 1115, the exposed portion 1115 allows the third adhesive element 1103 to be in contact with the bottom 1110, the case 1130, and the circuit assembly 1400 at the same time.

The optical element driving mechanism 1000 of the present disclosure further includes a first electronic element 1510 and a second electronic element 1520. The first electronic element 1510 may be, for example, a position sensing element for sensing the movement of the movable portion 1200. The first electronic element 1510 is disposed on the circuit assembly 1400. The second electronic element 1520 may sense an environmental parameter (e.g. parameters like temperature, pressure, inertia, etc.). The second electronic element 1520 is disposed on the circuit assembly 1400.

Specifically, the first electronic element 1510 is disposed on the first circuit surface 1425 of the second circuit portion 1420 (FIG. 7). The first circuit surface 1425 is initially a portion of the first circuit portion 1410 that faces downward in −Z direction. The second electronic element 1520 is disposed on the second circuit surface 1435 of the third circuit portion 1430 (FIG. 6). The second circuit surface 1435 is initially a portion of the first circuit portion 1410 that faces upward in +Z direction. That is, prior to bending the first circuit portion 1410, the first circuit surface 1425 and the second circuit surface 1435 are located on two opposite sides of the first circuit portion 1410 in Z direction. As shown in the figures, the first circuit surface 1425 faces the movable portion 1200, and the second circuit surface 1435 faces the fixed portion 1100. That is, the first circuit surface 1425 and the second circuit surface 1435 face in the same direction.

In addition, in some embodiments, the first electronic element 1510 may be a Hall sensor, corresponding to a third magnetic element 1530. In the embodiment shown in the figure, the third magnetic element 1530 is embedded in the holder 1210, on the side that is close to the first electronic element 1510. In some embodiments, as shown in FIG. 7, the first circuit surface 1425, on which the first electronic element 1510 is disposed, faces the first sidewall 1111 of the bottom 1110. Also, the first sidewall 1111 may have a hollowed U-shaped slot 1116, corresponding to the first electronic element 1510. Specifically, the width of the U-shaped slot 1116 may correspond to the width of the first electronic element 1510. The first electronic element 1510 may be placed on and in direct contact with the bottom surface of the U-shaped slot 1116. The bottom surface of the U-shaped slot 1116 may act as a positioning structure for the first electronic element 1510, defining the height of the first electronic element 1510 in Z direction. Through the U-shaped slot 1116, the first electronic element 1510 is exposed from the first sidewall 1111, so it is closer to the third magnetic element 1530. This further improves control precision.

As shown in FIG. 4, the shortest distance S1 between the center of the first electronic element 1510 and the movable portion 1200 is shorter than the shortest distance S2 between the center of the second electronic element 1520 and the movable portion 1200. As a result, the center of the first electronic element 1510 is closer to the movable portion 1200. This improves control precision. Additionally, the center of the second electronic element 1520 is closer to the fixed portion 1100, especially to the case 1130, in order to sense the environmental parameters (e.g. temperature, pressure, inertia, etc.) outside the optical element driving mechanism 1000. At the same time, the second electronic element 1520 may be protected by the case 1130, preventing the second electronic element 1520 from external interferences. This improves stability.

In addition, as shown in FIG. 4, there is spacing S3 between the center of the first electronic element 1510 and the center of the second electronic element 1520 in the direction of the main axis M. That is, the first electronic element 1510 and the second electronic element 1520 are located at different heights in the direction of the main axis M. As a result, the second electronic element 1520 is closer to the first circuit portion 1410 of the circuit assembly 1400, reducing the space required for circuit layout. This facilitates miniaturization of mechanism.

Figure 9:
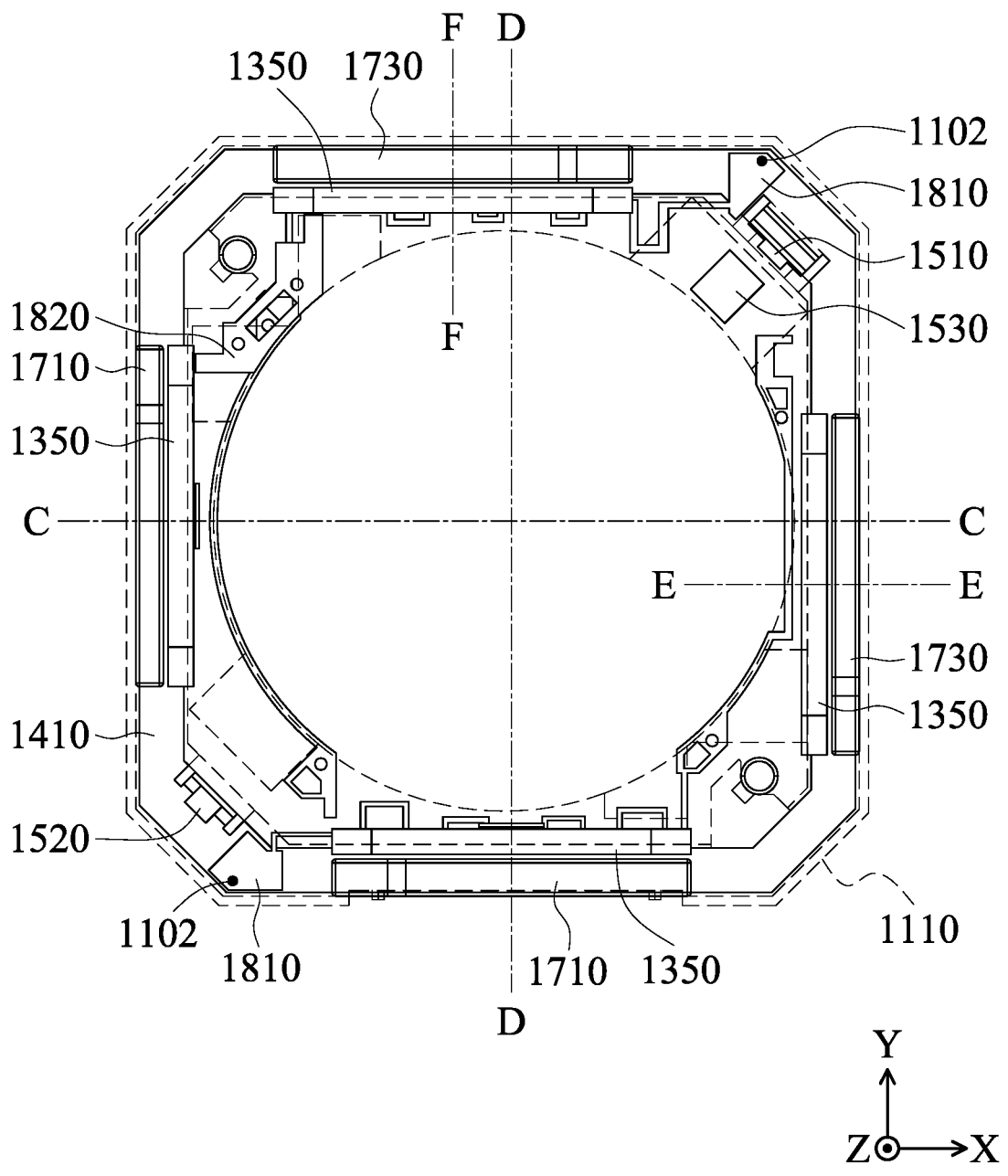
FIG. 9 shows a top view of the optical element driving mechanism, wherein the case, frame and holder are omitted, in accordance with some embodiments of the present disclosure.

Next, referring to FIG. 9, FIG. 9 shows a top view of the optical element driving mechanism 1000, wherein the case 1130, frame 1120 and holder 1210 are omitted, in accordance with some embodiments of the present disclosure. As mentioned above, the driving assembly 1300 includes a plurality of coils, such as the four coils 1350 shown in FIG. 9. The coils 1350 may be disposed around the winding pillars on outer sides of the holder 1210, facing the fixed portion 1100, as shown in FIG. 2.

The optical element driving mechanism 1000 in the present disclosure further includes a first resilient assembly 1810 and a second resilient assembly 1820. The first resilient assembly 1810 may include two resilient elements with bent structures. Each location of the two resilient elements corresponds to the first magnetic element 1710 and the second magnetic element 1730, respectively. The second resilient assembly 1820 is disposed between the two resilient elements of the first resilient assembly 1810. Each of the resilient elements is electrically connected to two coils, respectively. And, each of the resilient elements is electrically connected to the first circuit portion 1410 via a second positioning element 1102. As a result, every coil 1350 is electrically connected to the first circuit portion 1410. In the embodiment shown in FIG. 9, the second positioning elements 1102 are positioning pillars protruding from the bottom 1110. They can position the first circuit portion 1410 and the first resilient assembly 1810 at the same time. In other embodiments, glue may be applied to the second positioning elements 1102 to strengthen the fixation of the first circuit portion 1410 and the first resilient assembly 1810. In addition, the second resilient assembly 1820 may be used for connecting the coils 1350 in series. For example, the resilient element of the first resilient assembly 1810 that is affixed at the top right corner in FIG. 9 may electrically connect the two coils 1350 arranged in Y direction, and the resilient element of the first resilient assembly 1810 that is affixed at the bottom left corner in FIG. 9 may electrically connect the two coils 1350 arranged in X direction. By connecting the coils 1350 in +Y direction and in −X direction with the second resilient assembly 1820, the two sets of coils 1350 may be connected in series. This helps with synchronizing the control signals or power supplies.

Figure 10:
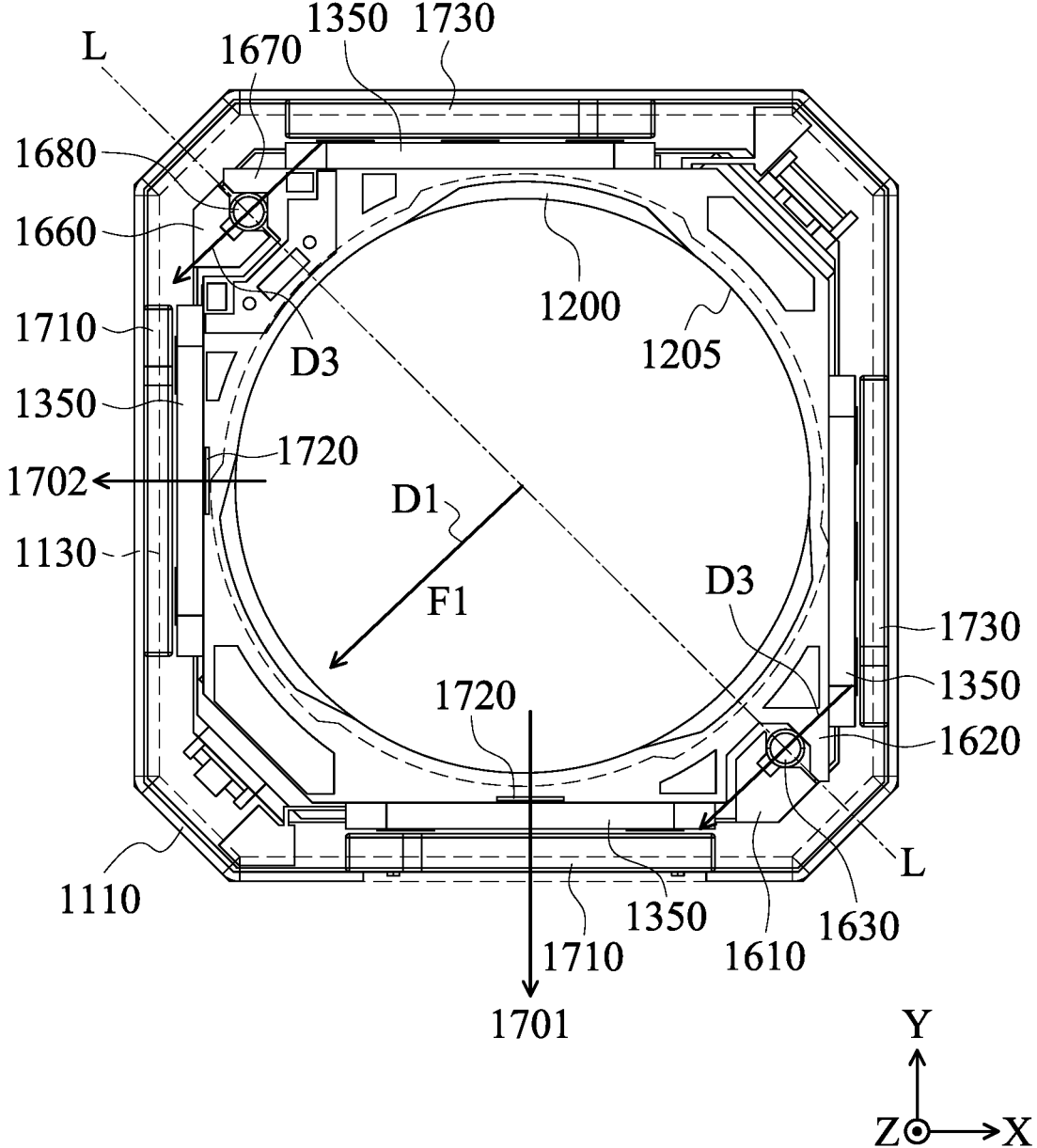
FIG. 10 shows a top view of the optical element driving mechanism, wherein the case is shown in broken lines, in accordance with some embodiments of the present disclosure.

Next, referring to FIGS. 9 and 10, FIG. 10 shows a top view of the optical element driving mechanism 1000, wherein the case 1130 is shown in broken lines, in accordance with some embodiments of the present disclosure.

The optical element driving mechanism 1000 in the present disclosure further includes an internal assembly 1600. The internal assembly 1600 has guiding functions. The movable portion 1200 is movable relative to the fixed portion 1100 via the internal assembly 1600. As shown in FIG. 10, the internal assembly 1600 includes a first counterpart element 1610, a first clamping element 1620, and a first internal element 1630. The first counterpart element 1610 is fixedly connected to the fixed portion 1100. In some embodiments, the first counterpart element 1610 is integral with the bottom 1110 of the fixed portion 1100, as shown in FIG. 5, extending in +Z direction. The first clamping element 1620 is fixedly connected to the movable portion 1200, corresponding to the first counterpart element 1610. In some embodiments, the first clamping element 1620 is integral with the holder 1210 of the movable portion 1200. The first internal element 1630 has a pillar structure, located between the first counterpart element 1610 and the first clamping element 1620. In some embodiments, the first internal element 1630 is movable relative to the first counterpart element 1610, the first clamping element 1620, or both. As shown in FIG. 10, the first clamping element 1620, the first internal element 1630, and the first counterpart element 1610 are arranged in sequence along the arrangement direction D3.

At the diagonal corner across from the first counterpart element 1610, the first clamping element 1620, and the first internal element 1630, the internal assembly 1600 further includes a second counterpart element 1660, a second clamping element 1670, and a second internal element 1680. The configuration of the second counterpart element 1660, the second clamping element 1670, and the second internal element 1680 is similar to that of the first counterpart element 1610, the first clamping element 1620, and the first internal element 1630. The second counterpart element 1660 is fixedly connected to the fixed portion 1100. In some embodiments, the second counterpart element 1660 is integral with the bottom 1110 of the fixed portion 1100, as shown in FIG. 5. The second clamping element 1670 is fixedly connected to the movable portion 1200, corresponding to the second counterpart element 1660. In some embodiments, the second clamping element 1670 is integral with the holder 1210 of the movable portion 1200. The second internal element 1680 has a pillar structure, located between the second counterpart element 1660 and the second clamping element 1670. In some embodiments, the second internal element 1680 is movable relative to at least one of the second counterpart element 1660 and the second clamping element 1670. In the embodiments of the present disclosure, the first internal element 1630 and the second internal element 1680 act as the component for guiding the movement of the movable portion 1200. This effectively increases the travel distance of the movable portion 1200 within a limited volume, improving the quality of optical focusing.

As shown in FIG. 10, the second clamping element 1670, the second internal element 1680, and the second counterpart element 1660 are arranged in sequence along the arrangement direction D3. It should be noted that the two arrangement directions D3 shown in FIG. 10 are substantially parallel to each other. In some embodiments, there is an angle about 45 degrees between the arrangement direction D3 and the X-axis. In addition, a connecting line L-L that connects the center of the first internal element 1630 and the center of the second internal element 1680 passes through the first opening 1205 of the movable portion 1200 when viewed in the direction that is parallel to the main axis M. In some embodiments, there is an angle about 45 degrees between the connecting line L-L and the X-axis.

The optical element driving mechanism 1000 of the present disclosure further includes a force-exerting assembly 1700 for stabilizing the movement of the movable portion 1200. As shown in FIG. 10, the force-exerting assembly 1700 mainly includes a first magnetic element 1710, a first magnetic-conductive element 1720, and a second magnetic element 1730. The first magnetic element 1710 may include two sets of magnets, such as the two sets of magnets that are disposed in −X direction and in −Y direction in FIG. 10. The second magnetic element 1730 may also include two sets of magnets, such as the two sets of magnets that are disposed in +X direction and in +Y direction in FIG. 10. Both the first magnetic element 1710 and the second magnetic element 1730 are disposed on the fixed portion 1100. In some embodiments, as shown in FIG. 3, the frame 1120 of the fixed portion 1100 may have a plurality of accommodating portions 1121, each corresponds to a set of magnets of the first magnetic element 1710 or the second magnetic element 1730. Each set of magnets may be fitted inside the accommodating portion 1121, thus being fixedly disposed on the fixed portion 1100.

In the embodiment shown in FIG. 10, the first magnetic-conductive element 1720 may be disposed on the movable portion 1200, corresponding to the first magnetic element 1710. Specifically, the first magnetic-conductive element 1720 may include two magnetic-conductive metal sheets, that are disposed on the two side surfaces of the movable portion 1200 facing the two sets of magnets of the first magnetic element 1710. The metal sheet in −Y direction corresponds to the magnets in the same direction, generating the first component force 1701 in −Y direction. The metal sheet in −X direction corresponds to the magnets in the same direction, generating the second component force 1702 in −X direction. The first force F1 in the first direction D1 is formed by combining the first component force 1701 and the second component force 1702.

In this embodiment, the angle between the first direction D1 and the arrangement direction D3 is smaller than 90 degrees. Therefore, the first force F1 may draw the first clamping element 1620 to abut against the first counterpart element 1610, and draw the second clamping element 1670 to abut against the second counterpart element 1660.

Figure 11:
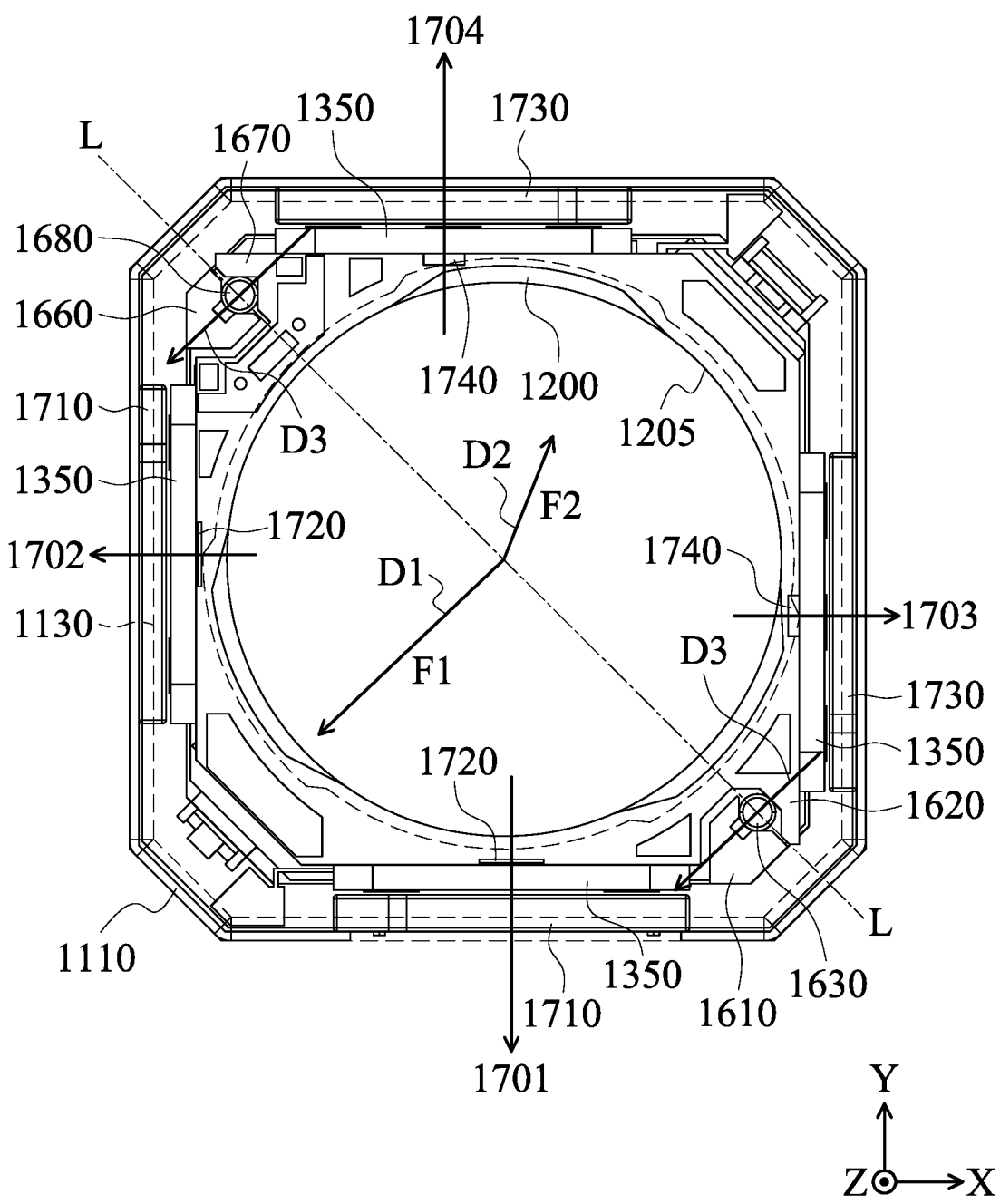
FIG. 11 shows a top view of the optical element driving mechanism, wherein the case is shown in broken lines in accordance with other embodiments of the present disclosure.

FIG. 11 shows a top view of the optical element driving mechanism 1000, wherein the case 1130 is shown in broken lines in accordance with other embodiments of the present disclosure. The structure shown in FIG. 11 is mostly the same as the structure shown in FIG. 10, wherein similar elements are indicated by similar reference numerals. The difference between FIG. 11 and FIG. 10 is that the force-exerting assembly 1700 in FIG. 11 further includes a second magnetic-conductive element 1740. Similarly to the first magnetic-conductive element 1720, the second magnetic-conductive element 1740 may be dispose on the movable portion 1200, corresponding to the second magnetic element 1730. Specifically, the second magnetic-conductive element 1740 may also include two magnetic-conductive metal sheets, that are disposed on the two side surfaces of the movable portion 1200 facing the two sets of magnets of the second magnetic element 1730. The metal sheet in +X direction corresponds to the magnets in the same direction, generating the third component force 1703 in +X direction. The metal sheet in +Y direction corresponds to the magnets in the same direction, generating the fourth component force 1704 in +Y direction. The second force F2 in the second direction D2 is formed by combining the third component force 1703 and the fourth component force 1704.

In this embodiment, both the first direction D1 and the second direction D2 point away from the connecting line L-L that connects the center of the first internal element 1630 and the center of the second internal element 1680. As shown in FIG. 11, the angle between the first direction D1 and the arrangement direction D3 is different from the angle between the second direction D2 and the arrangement direction D3. For example, the angle between the first direction D1 and the arrangement direction D3 is smaller than the angle between the second direction D2 and the arrangement direction D3. Specifically, the angle between the first direction D1 and the arrangement direction D3 may be smaller than 90 degrees, and the angle between the second direction D2 and the arrangement direction D3 may be greater than 90 degrees. The resultant force exerted on the movable portion 1200 is formed by combining the first force F1 and the second force F2. This resultant force is not parallel to the connecting line L-L that connects the center of the first internal element 1630 and the center of the second internal element 1680. Additionally, this resultant force may draw the first clamping element 1620 to abut against the first counterpart element 1610, and draw the second clamping element 1670 to abut against the second counterpart element 1660.

In some embodiments, the volume of the first magnetic element 1710 is the same as the volume of the second magnetic element 1730, but the volume of the first magnetic-conductive element 1720 is different from the volume of the second magnetic-conductive element 1740. Therefore, the strength of the first force F1 is different from the strength of the second force F2. For example, in the embodiment shown in FIG. 11, the volume of the first magnetic-conductive element 1720 is greater than the volume of the second magnetic-conductive element 1740, so the strength of the first force F1 is greater than the strength of the second force F2. As a result, the resultant force of the first force F1 and the second force F2 may draw the first clamping element 1620 to abut against the first counterpart element 1610, and draw the second clamping element 1670 to abut against the second counterpart element 1660. When the first clamping element 1620 abuts against the first counterpart element 1610, the first internal element 1630 with a guiding function is stably clamped between the first clamping element 1620 and the first counterpart element 1610, improving stability during the movement of the movable portion 1200. Similarly, when the second clamping element 1670 abuts against the second counterpart element 1660, the second internal element 1680 with a guiding function is stably clamped between the second clamping element 1670 and the second counterpart element 1660, further improving stability during the movement of the movable portion 1200.

As mentioned above, the first magnetic-conductive element 1720 and/or second magnetic-conductive element 1740 may be disposed on the side surface of the movable portion 1200, facing the magnets. Specifically, the magnetic-conductive metal sheets of the first magnetic-conductive element 1720 and/or second magnetic-conductive element 1740 and the coils 1350 may be affixed to the movable portion 1200 together by the same adhesive element (e.g. glue, not shown). In such embodiments, the coils 1350 are closer to the corresponding magnets than the magnetic-conductive metal sheets of the first magnetic-conductive element 1720 and/or second magnetic-conductive element 1740. Additionally, each of the magnetic-conductive metal sheets of the first magnetic-conductive element 1720 and/or second magnetic-conductive element 1740 is substantially aligned with the center of the corresponding coil 1350 and magnets, to obtain the most unified magnetic attraction forces.

In the embodiments according to the present disclosure, the first magnetic element 1710 and the second magnetic element 1730 not only generate magnetic attraction forces with the first magnetic-conductive element 1720 and the second magnetic-conductive element 1740, so that the movable portion 1200 would not detach from the first internal element 1630 and the second internal element 1680 when being shaken, but also correspond to the coils 1350 of the driving assembly 1300 and generate driving forces for driving the movable portion 1200 to move. Specifically, the magnets of the first magnetic element 1710 and the second magnetic element 1730 that are disposed on four sides of the fixed portion 1100 each corresponds to a coil 1350, as shown in FIGS. 10 and 11. As mentioned above, every coil 1350 is electrically connected to the circuit assembly 1400. When control signals are transmitted from external sources (e.g. a control device that is not shown) to the coils 1350 via the circuit assembly 1400, each coil 1350 generates an electromagnetic driving force with corresponding magnets, driving the movable portion 1200 to move relative to the fixed portion 1100.

In addition, as shown in FIG. 9, the contour of the fixed portion 1100 is substantially an octagonal shape, with four longer sides and four shorter sides. The first magnetic element 1710 and the second magnetic element 1730 are disposed on four longer sides to obtain the greatest possible magnetic forces in limited volume. Therefore, the greatest electromagnetic driving force for driving the movable portion 1200 and the greatest magnetic attraction force for stabilizing the movable portion 1200 may be obtained.

As shown in FIG. 9, in the embodiments of the present disclosure, the lengths of the coils 1350 are substantially the same as the lengths of their corresponding magnets (of the first magnetic element 1710 and the second magnetic element 1730). The centerline of the first magnetic element 1710 that is disposed in −X direction is represented by line C-C, the centerline of the first magnetic element 1710 that is disposed in −Y direction is represented by line D-D, the centerline of the second magnetic element 1730 that is disposed in +X direction is represented by line E-E, and the centerline of the second magnetic element 1730 that is disposed in +Y direction is represented by line F-F. As shown in the figures, lines C-C and D-D substantially pass through the center of the opening (the first opening 1205 shown in FIG. 10) of the movable portion 1200. However, line E-E does not overlap line C-C, and line F-F does not overlap line D-D either. In detail, line E-E is offset from line C-C in −Y direction, and line F-F is offset from line D-D in −X direction. These offsets are advantageous for reducing the interference made by the first magnetic element 1710 and the second magnetic element 1730 to the third magnetic element 1530 that is disposed at the corner. This avoids lowering sensing accuracy. In addition, the offsets also bring the first magnetic element 1710 and the second magnetic element 1730 closer to the internal assembly 1600. This is advantageous for increasing the clamping forces for first internal element 1630 and second internal element 1680, improving the stability of the movements of movable portion 1200.

Figure 12:
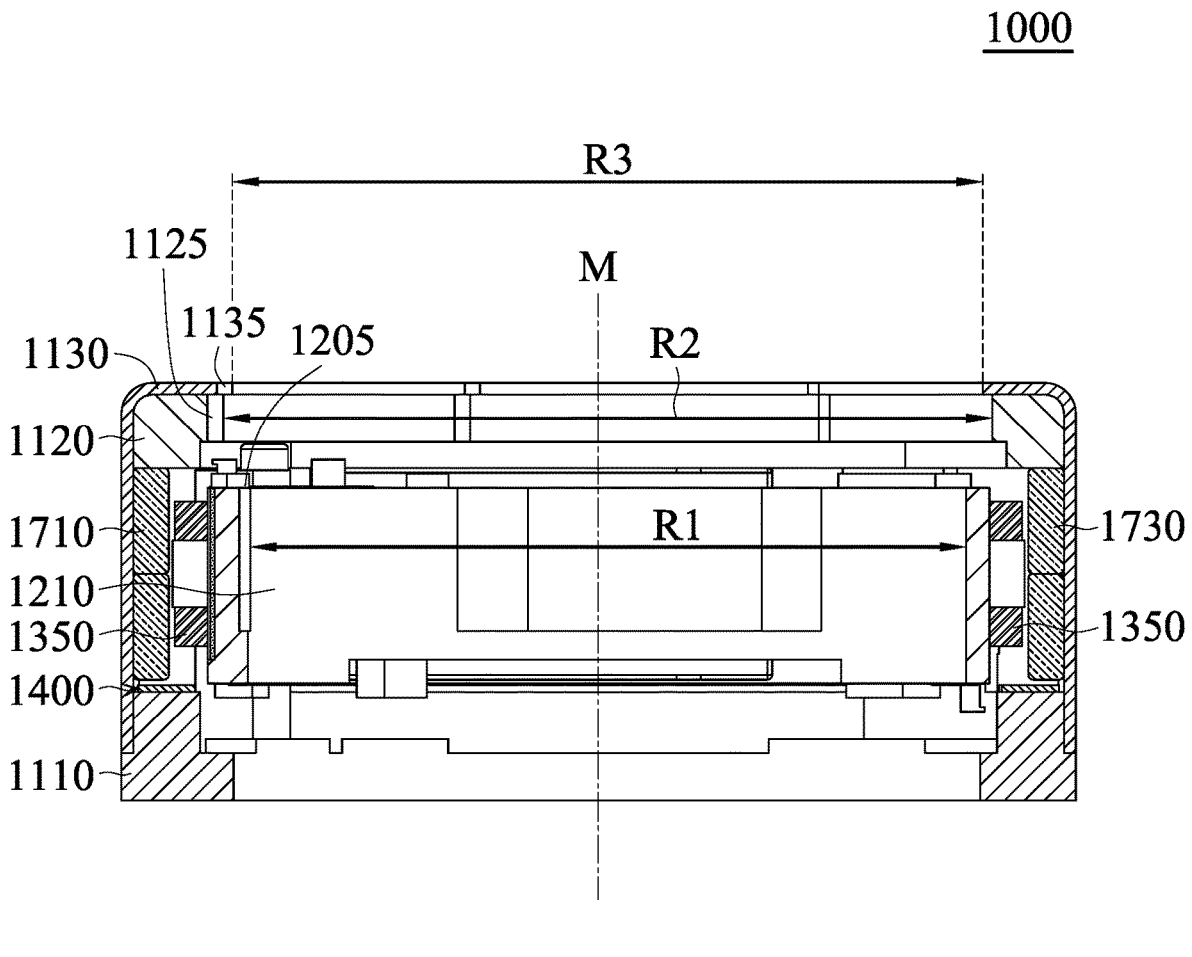
FIG. 12 shows a cross-sectional view of the optical element driving mechanism along line B-B in FIG. 1, in accordance with some embodiments of the present disclosure.

Referring to FIG. 12, FIG. 12 shows a cross-sectional view of the optical element driving mechanism 1000 along line B-B in FIG. 1, in accordance with some embodiments of the present disclosure. As shown in the figures, the holder 1210 of the movable portion 1200 has a first opening 1205, the frame 1120 of the fixed portion 1100 has a second opening 1125, and the case 1130 of the fixed portion 1100 has a third opening 1135. The diameter of the first opening 1205 is represented by the first diameter R1, the diameter of the second opening 1125 is represented by the second diameter R2, and the diameter of the third opening 1135 is represented by the third diameter R3. In the embodiment shown in FIG. 12, the second diameter R2 is larger than the third diameter R3, and the third diameter R3 is larger than the first diameter R1. As a result, none of the frame 1120 and case 1130 would obstruct the light entering the optical element 2000 (FIG. 1) that is disposed in the middle of the holder 1210. Also, the frame 1120 would not interfere the moving path of the movable portion 1200 in Z direction. Furthermore, the frame 1120 and the case 1130 may act as stoppers, limiting the upper extreme position of the movable portion 1200 in +Z direction. This improves the stability of the movements of movable portion 1200.

In summary, the optical element driving mechanism 1000 according to some embodiments of the present disclosure includes a driving assembly 1300 and two different sensing elements (e.g. the first electronic element 1510 and the second electronic element 1520). The electrical connection for all the components is achieved by the circuit assembly 1400, the first resilient assembly 1810, and the second resilient assembly 1820, so that there is no need for the fixed portion 1100 (e.g. the bottom 1110 and/or frame 1120) to embed any metal lines inside it. This simplifies the producing process and lowers the manufacturing costs. In addition, the force-exerting assembly 1700 ensures that the internal assembly 1600 can guide the movement of the movable portion 1200 stably, increasing the travel distance of the movable portion 1200, improving stability and control precision, thus improving the image quality of the optical element 2000.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
a movable portion, connected to an optical element;
a fixed portion, wherein the movable portion is movable relative to the fixed portion;
a driving assembly, driving the movable portion to move relative to the fixed portion; and
a circuit assembly, comprising:
    a first circuit portion with a plate structure, disposed on the fixed portion;
    a second circuit portion, connected to the first circuit portion;
    a third circuit portion, connected to the first circuit portion;
    a connecting portion with a bent structure, wherein the second circuit portion is connected to the first circuit portion via the connecting portion;
    a first adhesive element, disposed on the first circuit portion, with which the first circuit portion is adhered to the fixed portion; and
    a second adhesive element, disposed on the second circuit portion, with which the second circuit portion is adhered to the fixed portion;
wherein:
the first adhesive element is not in direct contact with the second adhesive element; and
at least a portion of the connecting element is not in direct contact with the first adhesive element or the second adhesive element;
wherein the fixed portion comprises:
a bottom, wherein the first circuit portion is disposed on a surface of the bottom; and
a case, fixedly connected to the bottom;
wherein the surface has an exposed portion that is exposed from the first circuit portion when viewed in a direction that is parallel to a main axis;
wherein:
the second adhesive element is in direct contact with a first sidewall of the bottom;
the connecting portion is not in contact with the bottom; and
the first sidewall has a dodging portion, corresponding to the connecting portion.

2. The optical element driving mechanism as claimed in claim 1, wherein:
the case is fixedly connected to the bottom via a third adhesive element;
the third adhesive element is in direct contact with the case and the bottom;
the third adhesive element is in direct contact with the circuit assembly; and
the surface is perpendicular to the main axis.

3. The optical element driving mechanism as claimed in claim 2, wherein:
the third adhesive element is in direct contact with the surface; and
the third adhesive element is in direct contact with the first circuit portion.

4. The optical element driving mechanism as claimed in claim 1, further comprising:
a first electronic element, sensing the movement of the movable portion, and disposed on the circuit assembly; and
a second electronic element, sensing an environmental parameter, and disposed on the circuit assembly;

wherein the shortest distance between the center of the first electronic element and the movable portion is shorter than the shortest distance between the center of the second electronic element and the movable portion.

5. The optical element driving mechanism as claimed in claim 4, wherein:
the first electronic element is disposed on a first circuit surface of the second circuit portion;
the second electronic element is disposed on a second circuit surface of the third circuit portion;
the first circuit surface faces the movable portion; and
the second circuit surface faces the fixed portion.

6. The optical element driving mechanism as claimed in claim 5, wherein:
the first circuit surface and the second circuit surface face in the same direction; and
there is a spacing between the center of the first electronic element and the center of the second electronic element in the direction of the main axis.

7. The optical element driving mechanism as claimed in claim 1, further comprising an internal assembly, wherein the movable portion is movable relative to the fixed portion via the internal assembly, wherein the internal assembly comprises:
a first counterpart element, fixedly connected to the fixed portion;
a first clamping element, fixedly connected to the movable portion, corresponding to the first counterpart element; and
a first internal element, located between the first counterpart element and the first clamping element;
wherein:
the first internal element is movable relative to the first counterpart element, the first clamping element, or both; and
the first clamping element, the first internal element, and the first counterpart element are arranged in sequence along an arrangement direction.

8. The optical element driving mechanism as claimed in claim 7, wherein the internal assembly further comprises:
a second counterpart element, fixedly connected to the fixed portion;
a second clamping element, fixedly connected to the movable portion, corresponding to the second counterpart element; and
a second internal element, located between the second counterpart element and the second clamping element;
wherein:
the center of the first internal element and the center of the second internal element are connected by a connecting line, and the connecting line passes through an opening of the movable portion when viewed in a direction that is parallel to a main axis.

9. The optical element driving mechanism as claimed in claim 8, wherein the optical element at least partially overlaps the opening when viewed in the direction that is parallel to the main axis.

10. The optical element driving mechanism as claimed in claim 8, further comprising a force-exerting assembly, stabilizing the movement of the movable portion, wherein the force-exerting assembly comprises:
a first magnetic element, disposed on the fixed portion; and
a first magnetic-conductive element, disposed on the movable portion, corresponding to the first magnetic element and generating a first force along a first direction;

wherein the first clamping element is drawn to abut against the first counterpart element by the first force.

11. The optical element driving mechanism as claimed in claim 10, wherein the force-exerting assembly further comprises:

a second magnetic element, disposed on the fixed portion; and a second magnetic-conductive element, disposed on the movable portion, corresponding to the second magnetic element and generating a second force along a second direction;

wherein:

the volume of the first magnetic element is the same as the volume of the second magnetic element;

the volume of the first magnetic-conductive element is different from the volume of the second magnetic-conductive element; and the strength of the first force is different from the strength of the second force.

12. The optical element driving mechanism as claimed in claim 11, wherein:

the volume of the first magnetic-conductive element is greater than the volume of the second magnetic-conductive element; and the strength of the first force is greater than the strength of the second force.

13. The optical element driving mechanism as claimed in claim 11, wherein:

both the first direction and the second direction point away from the connecting line that connects the center of the first internal element and the center of the second internal element; and the angle between the first direction and the arrangement direction is different from the angle between the second direction and the arrangement direction.

14. The optical element driving mechanism as claimed in claim 13, wherein the angle between the first direction and the arrangement direction is smaller than the angle between the second direction and the arrangement direction.

15. The optical element driving mechanism as claimed in claim 14, wherein:

the angle between the first direction and the arrangement direction is smaller than 90 degrees; and the angle between the second direction and the arrangement direction is greater than 90 degrees.

16. The optical element driving mechanism as claimed in claim 15, wherein:

a resultant force exerted on the movable portion is formed by combining the first force and the second force;

the resultant force is not parallel to the connecting line that connects the center of the first internal element and the center of the second internal element; and the first clamping element is drawn to abut against the first counterpart element by the resultant force.

* * * * *